RADIO FREQUENCY ANTENNAS

Original Filed Sept. 12, 1955 4 Sheets-Sheet 1

INVENTOR
Robert S. Weiss
BY Ely, Pearne & Gordon
ATTORNEYS

RADIO FREQUENCY ANTENNAS

Original Filed Sept. 12, 1955 4 Sheets-Sheet 2

INVENTOR
Robert S. Weiss
BY Ely, Pearne & Gordon
ATTORNEYS

RADIO FREQUENCY ANTENNAS
Original Filed Sept. 12, 1955 4 Sheets-Sheet 3
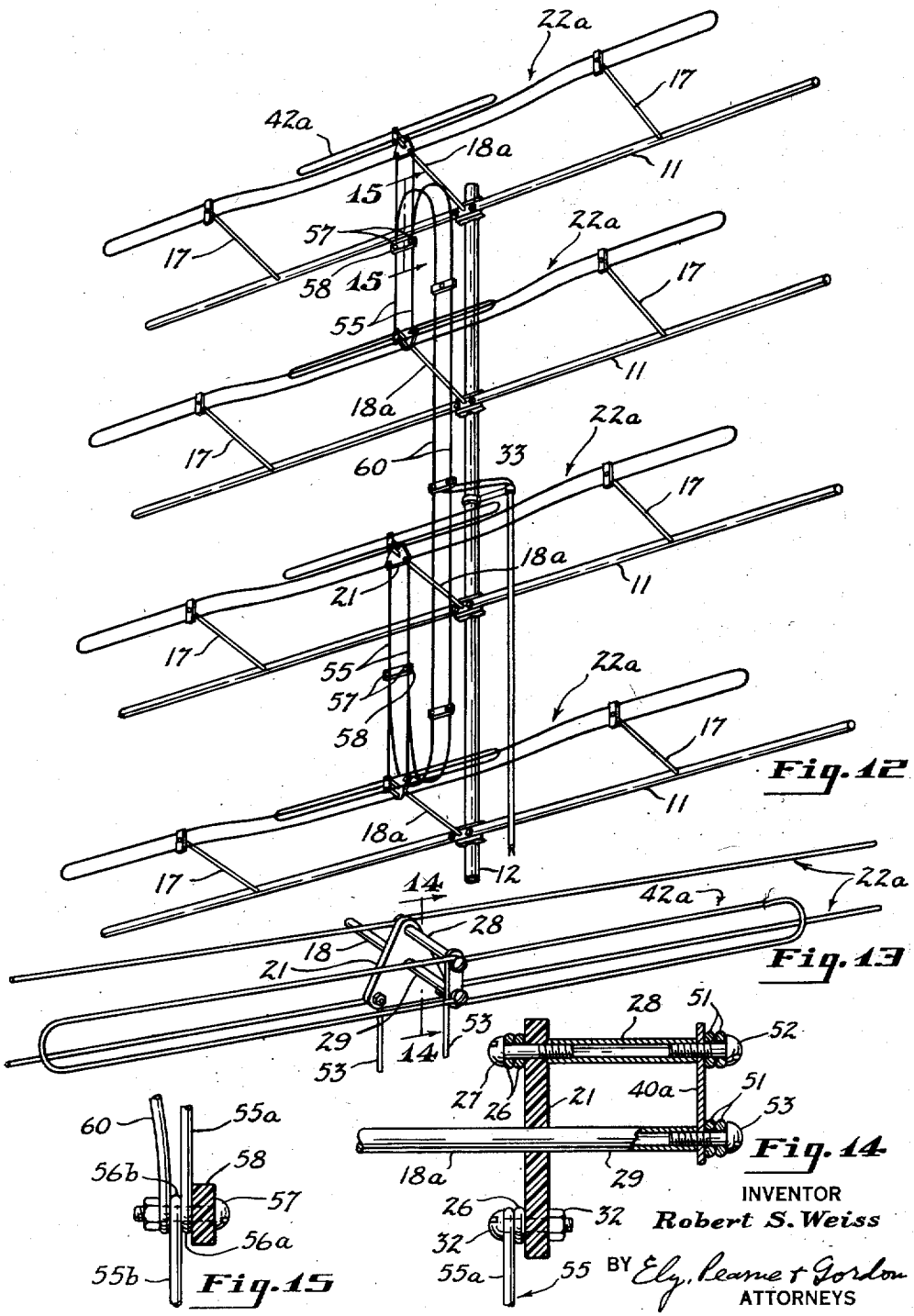
INVENTOR
Robert S. Weiss
BY Ely, Beame & Gordon
ATTORNEYS

RADIO FREQUENCY ANTENNAS

Original Filed Sept. 12, 1955 4 Sheets-Sheet 4

INVENTOR.
ROBERT S. WEISS
BY Ely, Pearne & Gordon

ATTORNEYS

United States Patent Office

Re. 24,413
Reissued Jan. 7, 1958

24,413

RADIO FREQUENCY ANTENNAS

Robert S. Weiss, South Euclid, Ohio, assignor to Finney Manufacturing Company, Cuyahoga County, Ohio, a corporation of Ohio Original No. 2,726,390, dated December 6, 1955, Serial No. 533,851, September 12, 1955. Application for reissue June 24, 1957, Serial No. 672,532

25 Claims. (Cl. 343—803)

Matter enclosed in heavy brackets [ ] appears in the original patent but forms no part of this reissue specification; matter printed in italics indicates the additions made by reissue.

This invention relates to radio frequency antennas and particularly to antennas for television reception.

One of the principal problems facing the television antenna industry has been to provide an antenna having high gain with a reasonably uniform impedance over the entire low and high band frequency ranges established for commercial television broadcasting. Another problem facing this industry has been to provide such an antenna which also has high directivity, low receptivity at other frequencies and a high "front to back ratio" to keep interference to a minimum. Still another problem has been to provide an antenna having all of the foregoing electrical characteristics and which is sufficiently small in size, light in weight, and easy to package, ship, and install to be a practical commercial article. These problems are all so well recognized in the art as to require no elaboration.

Meeting all of the foregoing problems in an entirely satisfactory manner for all television channels in both the low and high band ranges is something no one has even closely approached with any commercially successful product. All of the so-called "broad band" television antennas on the market today involve many compromises in design. The best of these maintain close to their maximum efficiency over only a portion of the low and high television bands and most of them are substantially less efficient in one band than in the other.

In the course of the development of this art, a few basic types of driven elements, or driven arrays of elements, have become generally recognized as being the most efficient within the permissible size limitations imposed on any commercial antenna for this purpose. In general, those elements or arrays most suitable for low band operation are relatively inferior for high band operation, and vice versa. As a result, most of the attention of the television antenna industry has been directed to various modifications of these few basic types of driven elements to broaden their response, and to the utilization of one or more of these few basic types of driven elements or driven arrays in various combinations, with various arrangements of non-driven or "parasitic" directors and reflectors being employed in conjunction therewith to improve the gain over a broader frequency range.

In addition, to further increase the gain obtainable, the combinations of driven and non-driven elements or arrays have been duplicated by vertically stacking a number of such combination units on a single mast. The combination of stacked units is then connected to a single transmission line by means of a suitably designed circuit for matching the impedance of the entire antenna to the impedance of the standard 300 ohm transmission line.

Where improvement in any of these basic elements per se has been accomplished, this has generally involved the use of conductors of impractically large surface area to provide very low "Q" elements, or has involved other undesirable features from the standpoint of weight, wind resistance, production and material costs, etc. Where combinations of such basic elements have been utilized to obtain better performance, they have generally been quite complex, both electrically and structurally. This has created manufacturing, packaging, shipping, and installation problems, which have often limited the commercial feasibility of otherwise acceptable antenna designs.

The principal object of the present invention is to improve certain of the basic types of driven elements so as to render them more efficient in meeting the above problems encountered in designing antennas for good reception over long distances throughout both the low and high commercial television bands.

Another principal object of the invention is to improve certain of the basic types of driven elements in meeting the above problems while employing conductor materials of moderate cross-sectional dimensions, i. e. moderate or high Q elements, or elements having a high ratio of length to surface area or diameter.

Another object of the invention is to achieve the foregoing objective in an electrically and structurally simple manner, to facilitate the stacking of a plurality of the modified units without undue structural complication or the necessity for using any complicated impedance matching circuit.

Still another object of the invention is to provide a simple, basic antenna array that is efficient in both the low and high band television frequency ranges, that discriminates well against signals at frequencies outside those ranges, and is adaptable for use with many different combinations of parasitic directors and/or reflectors, as may be found useful in the solution of a wide variety of special problems in radio as well as television.

A more specific object of the invention is to increase the efficiency of a simple, basic antenna element, designed for a relatively low frequency range, when it is used in a substantially higher frequency range.

Another specific object of the invention is to provide an arrangement for adjusting the impedance of a dipole antenna element more closely and uniformly to a desired value in two widely separated frequency ranges, such as the low and high band television frequency ranges.

Further objects of the invention are to accomplish all of the foregoing objectives with an antenna structure readily adaptable to existing manufacturing, packaging, shipping, and installation facilities.

Where reference has been made in the foregoing discussion to a "driven" antenna element, it is to be understood that this has reference to the manner in which that element would function if the antenna were employed for transmitting a signal instead of receiving a signal. Throughout this application, the term "driven" is used in that sense, it being understood that the operation when transmitting signals is merely the reverse of its operation when receiving signals.

Since conventional conductors used as the driven elements of dipole antennas are generally in the form of round tubes or rods where moderate and high Q values are acceptable, and since the Q value of such dipole elements varies directly with diameter, it is convenient to refer to the ratio of length to diameter, or to the L/D ratio, where L is the total tip-to-tip length of the dipole. This practice is followed hereinafter, it being understood that reference to conductors having specified L/D ratios are intended to include conductors which are not round, but which have the same Q value and, therefore, an equivalent L/D ratio.

U. S. Patent No. 2,580,798 to Kolster discloses two or more low Q dipoles of substantially different length disposed in closely spaced parallel relationship, the dipoles being capacitatively coupled so that their net reactance, as seen by the associated transmission line, is low at all frequencies throughout a wide band of frequencies, e. g. throughout a range in which the ratio of the terminal frequencies is 3:1 or more. In this manner, Kolster obtained a good impedance match to the same transmission line and a low standing wave ratio over an entire frequency range of that magnitude, with a very acceptable impedance match and standing wave ratio over an even broader range. Kolster disclosed his results as being dependent upon the use of low Q elements, e. g. "of the order of 5 and preferably much less." This involves the use of conductors of such large surface area as to be commercially and practically of little value, for the reasons mentioned above, particularly where low cost, mass production and outdoor installations are desired. In addition, though Kolster's antenna designs have excellent characteristics throughout a frequency range great enough to include both the low and high television bands, they possess the disadvantage for television of having equally good, if not even better, characteristics over the frequency range between the low and high bands, and quite good characteristics above and below those bands. As a result, such antennas are incapable of efficiently rejecting radiation outside the desired low and high bands, with resultant interference from unwanted radio frequency signals (police, amateur, radio-telephone, and other radio communication signals) and from radiation from industrial equipment and the like.

I have now found that, for efficient operation over the low and high television bands, the low Q elements of Kolster are unnecessary and undesirable, and that similar results can be obtained in those frequency ranges without a high capacitive coupling between conductors of large surface area, which Kolster apparently considered essential. At the same time, I have found that, by using moderate or high Q radiating elements and omitting the added inductance preferably connected by Kolster across the terminals of his antennas, the characteristics sought by Kolster can be obtained in and substantially confined to the low and high television frequency ranges, thus reducing the likelihood of interference from unwanted signals. The present invention utilizes these discoveries to accomplish the above recited objectives in a manner highly suited to the needs of the television antenna industry, as hereinafter described in detail.

The invention is characterized by the modification of a conventional driven dipole, of either the straight or folded dipole type, constructed of moderate or [low] *high* Q conductors having an L/D ratio of at least 40, and preferably higher, and having lengths selected for conventional operation in a low frequency range, such as the low band of commercial television frequencies (54 to 88 mc.). As is well known, such an antenna element, designed for low band operation, generally has a poor radiation pattern and relatively low gain when operating in the high band of television frequencies (174 to 216 mc.).

The modification of a dipole, in accordance with the present invention, involves the mounting of one or more additional shorter dipole elements (which may have a similarly high L/D ratio) parallel to the first dipole and in closely spaced relationship therewith, at least one preferably being disposed in front of the first dipole with respect to a signal to be received.

The first dipole is driven in a conventional manner by connection to a television receiver through a two-conductor transmission line, but the additional dipole or dipoles are non-driven. The spacing between the driven dipole and the additional dipole or dipoles is substantially less than the spacing heretofore used between a driven dipole and a director or reflector, so far as I am aware. This spacing is in the range of about 1% to about 7% or less of a half-wave length in the low frequency range to which the driven dipole is resonant, depending upon various other factors hereinafter mentioned. The resultant mode of operation, as hereinafter explained, is radically different from the operation of a director and/or a reflector in combination with a driven element.

In one simple form of the invention particularly suited for television reception, the driven dipole is preferably of the folded dipole type adapted for use broadside to the signal to be received. A single additional non-driven dipole is disposed parallel thereto and is centrally aligned therewith in the path of the signal to be received, i. e. a straight line from the signal source would pass through the center of both the driven and non-driven dipoles. The first or driven dipole is preferably made resonant as a half-wave dipole to a frequency near the center of the low band at, say, 65 mc. The second or non-driven dipole is preferably approximately one-third the length of the first, so that it would then be resonant as a half-wave dipole at, say, 195 mc. near the center of the high band. In this case, the second dipole would be longitudinally coextensive with approximately the central one-third of the first dipole.

The first or driven dipole of such an antenna, when dimensioned as a half-wave dipole in the low band range, is not materially affected by the presence of the second dipole when operating in the low band range. The antenna, at the terminals of the first dipole, has very close to its normal impedance at its resonant frequency. As a result, it functions essentially as a conventional half-wave folded dipole over the low band range as regards gain, impedance, and radiation pattern. However, when the antenna is operating in the high band range, I have discovered that the presence of the second dipole in close proximity to the first, when properly dimensioned and positioned in front of the driven dipole, causes the antenna to have gain and impedance characteristics and a radiation pattern in the two forward quadrants that are closely similar to those of an array of three, high band, half-wave elements connected for in-phase operation as a collinear array. In addition, the combination has a substantial front-to-back ratio.

An array of three half-wave collinear elements, dimensioned for about the center of the high band, has been widely recognized and accepted as being about the most efficient array for television reception over the high band range. It has high gain, a narrow radiation pattern, and an impedance of about 300 ohms at its reactant frequency. Also, the impedance variation over the high band range of frequencies is well within the limits for efficient transfer of energy to a 300 ohm transmission line. Its principal drawback has been that it is a relatively inefficient array when operating in the low band, far below the high band resonant frequency.

A half-wave folded dipole, dimensioned for about the center of the low band, on the other hand, has been widely recognized as being about the most efficient, driven, half-wave element for television reception over the low band range. It also has an impedance of about 300 ohms at its resonant frequency, with relatively small impedance variation over the low band range of frequencies. Its principal and well known drawback is that it is a relatively inefficient array when operating in the high band.

By utilizing the discovery described above, the highly efficient and desirable electrical characteristics of a collinear array on high band and of a folded dipole on low band can be combined in one simple array with no complicated phasing stubs or impedance matching circuits while utilizing conventional, moderate or high Q conductors. Thus, when applying my discovery to television reception over both the low and high band ranges, I preferably use a low band, half-wave, folded dipole as the driven element to obtain a good impedance match to a 300 ohm line over the low band range; and I dispose a shorter, non-driven element centrally in front of the folded dipole and in close proximity thereto to produce high gain in the high band range with a good impedance match to a 300 ohm line and high directivity.

At the resonant frequency of the half-wave folded dipole in the low band, the impedance is very close to 300 ohms, and at some frequency in the high band, depending upon the exact length and shape of the non-driven element and its spacing from the folded dipole, the impedance can also be brought very close to 300 ohms. To achieve optimum results, the precise length and shape of the non-driven element and its proper spacing from the driven, folded dipole are best determined experimentally. However, when using a non-driven element about one-third the length of the driven dipole, the proper spacing will generally be within the range of about 1% to about 7% of a half-wave length at the low band resonant frequency of the driven element. The size and shape of the added non-driven element is subject to considerable variation to suit the particular needs, as hereinafter explained in more detail.

The same beneficial results may be obtained with the non-driven dipole disposed vertically above or below the driven dipole, instead of in front of the driven dipole, or with a pair of identical, transversely aligned, non-driven dipoles, one disposed in front of and one behind the driven dipole, with equal spacing except that, as would be expected in these cases, the array has no front-to-back ratio. Also, three or more such non-driven dipoles may be disposed in transversely aligned relationship about the driven dipole in a generally cylindrical array. The use of a plurality of such transversely aligned, non-driven dipoles provides greater impedance adjustably at the sacrifice of the front-to-back ratio, but otherwise produces essentially the same results as when but one non-driven dipole is disposed in front of or above the driven dipole.

*Because the radiation of a given driven element may generally be considered to be constant for a given power input (assuming no change in impedance match with the transmission line) it is apparent that the addition of a parasitic element or combination of parasitic elements for changing the radiation pattern, so as to concentrate the radiation in a desired direction, essentially involves only a redistribution of the radiated energy without increasing its amount. Thus, narrowing or sharpening forward and rearward lobes and reducing or eliminating side lobes in a radiation pattern increases the amount of the constant, total energy that is radiated in the forward and rearward directions without, however, increasing the total energy radiated. This is the effect of using a pair of non-driven, parasitic dipoles closely spaced in front and behind a driven dipole in the manner mentioned in the preceding paragraph. Similarly, where the same general change is made in the radiation pattern while also increasing the magnitude of the forward lobe relative to the rearward lobe, a still greater proportion of the total energy is radiated in the forward direction as is normally desired for television reception, for example, and a smaller proportion of it is radiated in the rearward direction. This is the effect where only a single, parasitic, non-driven dipole is employed in closely spaced relationship with a driven dipole and in front of it or in the so-called 0° position. Obviously, therefore, dispensing with a rearward, closely spaced, non-driven dipole not only reduces the undesired rearward radiation component with a resultant decrease in interference from the rear when the antenna is used as a receiving antenna, but it also increases the forward radiation component so as to further increase the gain in the desired forward or 0° direction. The improved performance, moreover, is achieved in this manner with a simpler, lighter weight, and less expensive array with consequent obvious commercial advantages.*

Where it is desired to use a longer driven dipole that is a full wave long or 3/2 waves long etc. at a frequency in the low band range, a plurality of longitudinally spaced, non-driven dipoles, or generally cylindrical arrays of non-driven dipoles, may be similarly associated with the driven dipole to obtain the desired current phasing and impedance values in the high frequency range in which the non-driven dipoles are resonant. In this case, the non-driven dipoles are still cut to operate as half-wave elements in the high frequency range. Such variants of the simpler arrangements referred to above will be more fully explained hereinafter.

In all forms of the invention the resonant length of the driven dipole is about three times, or a higher integral multiple of the resonant length of the added, non-driven dipole or dipoles; and the space between the driven and non-driven dipoles is from about 1% to about 7% of a half-wave length at the low operating frequency to which the driven dipole is resonant. When the driven dipole is a half-wave long at the low resonant frequency for which the array is designed, and the non-driven dipole is a half-wave long at the higher resonant frequency for which the array is designed, according to the preferred forms of the invention for television, the driven dipole is about three times the length of the non-driven dipole or dipoles; the latter is centrally aligned with the former when each is broadside to a signal to be received; and the space between the driven and non-driven dipoles is about 1% to about 7% of the half wave resonant length of the driven dipole, which is roughly its physical length when using conductors having an L/D ratio of 40 or higher. Preferably, in this case, the L/D ratio is at least 80 and may be as great as 600 or more, and the spacing of the driven and non-driven dipoles in this case is preferably from about 1% to about 5% of the length of the driven dipole.

In all forms of the invention, the added non-driven elements have little effect on the operation of the driven element at or near the frequency at which it is resonant in the low frequency range. However, at a higher frequency at which the added, non-driven elements are resonant as half-wave elements, they have pronounced favorable effects on either the impedance or the radiation pattern of the antenna, or both.

In each case, further improvement may be obtained by the use of conventional directors and/or reflectors. The number of non-driven elements, the lengths of the driven and non-driven elements, the lengths of the directors and/or reflectors, their spacing from the driven element, and the diameters of the driven and non-driven elements in relation to their length may all be adjusted to vary the impedance of the entire array in the low and high bands and to adjust the frequencies of maximum response in the low and high bands to best suit the particular needs to be filled.

While the invention has been discussed above primarily in relation to the problems of television reception, it will be appreciated that the principles employed are equally useful in the solution of other radio frequency reception problems. Thus, the invention will be found to be applicable to many situations in which it is desired to employ the same antenna in widely separated frequency ranges and/or to render it less frequency sensitive.

With the foregoing general discussion in mind, the invention will be better understood from the following detailed description of a number of illustrative embodiments of the invention, considered together with the accompanying drawings, in which—

Fig. 12 is a perspective view of still another form of the invention in which four substantially identical arrays are stacked in vertically spaced relationship and connected in parallel through a suitable impedance matching circuit to the same two-conductor transmission line;

Fig. 13 is a fragmentary, perspective view, on an enlarged scale, of the non-driven element in one of the bays of the antenna of Fig. 12, showing how it is mounted with respect to the driven element;

Fig. 14 is a vertical sectional view of the structure shown in Fig. 13, the plane of the section being indicated by the line 14—14 in Fig. 13;

Fig. 15 is a fragmentary, vertical, sectional view of the antenna shown in Fig. 12, the plane of the section being indicated by the line 15—15 in Fig. 12;

Figure 1:
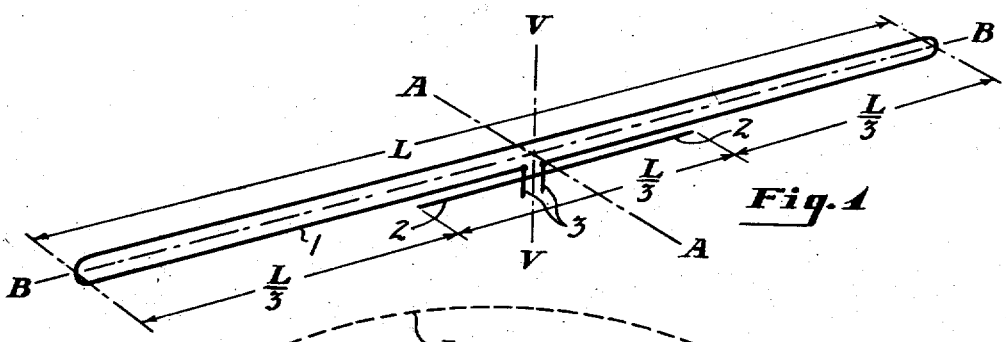
Figure 1 is a diagrammatic perspective view of a folded dipole and a straight dipole arranged in accordance with invention.
Figure 2:
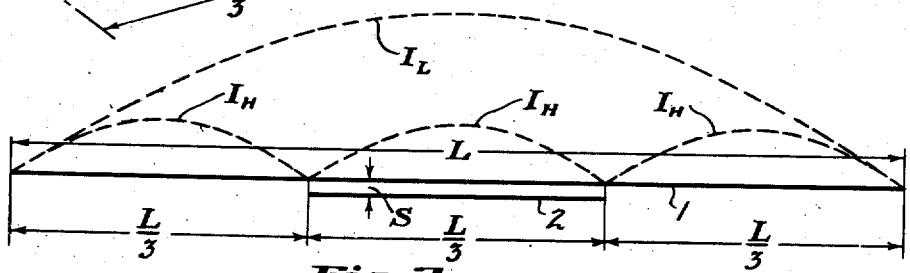
Fig. 2 is a diagrammatic plan view of the dipole arrangement of Fig. 1.

Referring first to the embodiment of the invention illustrated diagrammatically in Figs. 1 and 2, an elongated folded dipole 1 and a much shorter, straight dipole 2 are disposed in closely spaced parallel relationship. To assist in visualizing the spacial relationship of the two dipoles, a horizontal axis A—A is shown in Fig. 1 to represent a line from the antenna to the source of a signal to be received; a second horizontal axis B—B, normal to the axis A—A, represents the longitudinal axis of the folded dipole 1; and a vertical axis V—V represents the transverse axis of the folded dipole 1, the two long portions or spans of the folded dipole being disposed one above the other in a vertical plane containing the axis V—V. The short dipole 2 is disposed centrally in front of the long dipole 1, with respect to a signal to be received, and is bisected by the horizontal axis A—A. The length of the long dipole 1 is represented by the dimension L, and the length of the short dipole 2 is one-third the length L of the long dipole, as indicated by the dimension L/3. The long dipole 1 is a driven element and is connected to a two-conductor transmission line as indicated by the leads 3. The short dipole 1 is non-driven.

For television reception over the low and high band frequencies, the driven and non-driven elements of the antenna of Figs. 1 and 2 may desirably be made of aluminum tubing up to say, ½ inch in diameter or may suitably be made of smaller diameter rod down to ⅛″ diameter or even smaller. Since the length L would normally be at least 80 inches, and preferably more, it will be observed that the L/D ratio would be in the range of from around 160 to as high as 1000 for the driven element. Since tubes larger than 1 inch in diameter would seldom be desired for commercial television antenna elements, the driven element of the antenna of Figs. 1 and 2 would normally have an L/D ratio of at least 80, and preferably at least 150, though an L/D ratio as low as about 40 might be structurally and economically practical in some instances.

Depending upon various physical factors, such as those that affect the resonant lengths of conductors having finite dimensions, the above mentioned dimensional relationships will vary somewhat in practice, but should be of the general order indicated. Also, minor variations will affect the frequencies at which optimum performance is achieved without altering the basic mode of operation of the antenna.

These same factors will affect the optimum spacing of the two dipoles, indicated in Fig. 2 by the dimension S. In general, the smaller the diameter of the conductor material of which the dipoles are constructed, the smaller is the dimension S, other factors being equal. As noted above, the dimension S is adjusted to obtain the optimum impedance match at about three times the half-wave resonant frequency of the folded dipole 1, the impedance of the antenna being progressively reduced as the dimension 5 is decreased.

In this connection, it should be noted that the driven folded dipole 1 preferably has its long parallel spans disposed in a plane normal to the path A—A of a signal to be received, as shown in Fig. 1, and the spacing of the driven and non-driven elements 1 and 2 is measured along the signal path A—A. However, the driven folded dipole 1 may have its long parallel spans disposed substantially in a common plane with the added non-driven element 2, or in some other plane. In such case, surprising as it may be, the critical spacing S is the distance between the added non-driven element 2 and the span of the folded dipole 1 to which the leads 3 of the transmission line are connected, measured along the signal path A—A, regardless of which of the two long spans of the folded dipole 1 is closest to the non-driven dipole 2. References in the appended claims to the spacing between a driven folded dipole and an added non-driven dipole are intended to be interpreted accordingly.

When operating at the relatively low half-way resonant frequency of the folded dipole 1, the presence of the short dipole 2 has little effect, and the instantaneous current in each of the upper and lower spans of the folded dipole may be represented by the dotted curve $I_L$ in Fig. 2. However, when operating at about three times that frequency, the indicated mode of operation (judged by the impedance at the terminals 3, the forward gain, and the shape of the radiation pattern in the two forward quadrants) produces instantaneous currents in each of the upper and lower portions of the folded dipole 1 which appear to consist of three in-phase components represented by the dotted curves $I_H$. In these current representations, it will be understood that the curves are intended to represent relative wave lengths or frequencies, but not the relative magnitudes of the current.

*Further theoretical considerations have suggested still another explanation of the results just described. As is well known, two center-fed half-wave dipoles, spaced a half-wave apart in a collinear array and connected in phase to a two conductor transmission line, provide substantially the same radiation pattern and nearly the same*

*gain as a collinear array of three half-wave elements connected together for in-phase operation (as by quarter-wave, shorted stubs) and center fed as a unit by a two conductor transmission line. Since a plurality of parallel, coextensive, closely spaced conductors may function as a resonant transmission line section, they may be substantially non-radiating when properly energized. The amount of radiation emanating from a section of transmission line may be reduced by reducing the spacing of the conductors constituting the section. Within the maximum limit of the spacing of driven and non-driven dipoles herein disclosed, using conventional moderate or high Q conductors, the coextensive sections of driven and non-driven dipoles approximate a resonant transmission line section and, hence, the radiation of one tends to counteract or cancel the radiation of the other. The extent to which the parallel, coextensive line sections approach an ideal transmission line section depends in part upon their spacing and is generally enhanced as the spacing is reduced within the range herein disclosed.*

*Thus, in the antenna of Figs. 1 and 2, it now appears that the central current loop $I_H$ may be absent entirely or so greatly minimized (whether in-phase or out-of-phase) as to have little effect on the operation of the antenna at the half-wave resonant frequency of the non-driven dipole 2. In this way, the antenna may be said to function at the latter frequency so as to produce the effect of two center-fed, half-wave dipoles spaced a half wave apart in a collinear array and driven in phase.*

At the low, half-wave, resonant frequency of the folded dipole 1, the impedance at the terminals 3 is substantially the normal 300 ohms. By proper adjustment of the spacing S, the impedance of the antenna at about three times that low frequency can also be brought to substantially 300 ohms, while achieving the other characteristics of a three-element collinear array referred to above. By reason of the fact that these low and high optimum frequencies are in the ratio of about 1:3, the antenna may be designed to have its two optimum operating frequencies close to the middle of the low and high television bands, respectively, at say 65 mc. and 195 mc.

When so designed, the antenna of Figs. 1 and 2 will maintain a very good standing wave ratio over the low and high band frequency ranges, which ratio will depend somewhat on the various dimensional considerations discussed above. Between the low and high band frequency ranges, and above and below those ranges, however, the standing wave ratio rises very rapidly to exceedingly high values. Thus, this antenna has the very desirable tendency to discriminate against signals outside the two ranges of frequencies for which it is designed.

Figure 3:
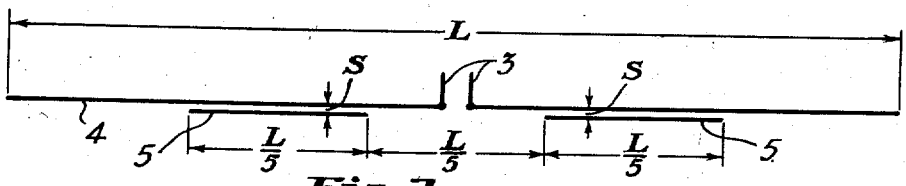
Figure 3 is a diagrammatic plan view of a straight, driven dipole with two added, non-driven dipoles.

Referring now to the form of the invention shown in Fig. 3, an elongated, driven, straight dipole 4, having a length L may have two identical, relatively short, non-driven, straight dipoles 5, disposed in front of it, parallel thereto, and in longitudinally spaced relationship relative to each other. Each of the short, non-driven dipoles 5 is about ⅕ the length of the long, driven dipole 4, and they are spaced from each other a distance about equal to their individual lengths, as indicated by the dimension L/5. Thus, alternate fifths of the length of the long dipole 4 have short dipoles 5 disposed in front thereof with respect to a signal to be received. The conductor materials are preferably in the same conventional range of diameters as the antenna of Figs. 1 and 2 for use in the television frequency ranges.

In this case, the long dipole 4 may be operated as a full-wave dipole at a relatively low frequency, and the presence of the added short dipoles 5 will have little effect. At about 2½ times this low frequency, however, the added short dipoles 5 function to provide a larger forward lobe in the radiation pattern and to reduce the lobes at other angles, thus improving the performance at the higher frequency. Also, the added dipoles may assist in bringing the impedance of the antenna in the high frequency range closer to 300 ohms. The low and high optimum frequencies for the antenna of Fig. 3 are in the ratio of about 1:2½ or 2:5. Thus, this antenna may be designed to have its two optimum operating frequencies in the upper half of the low television band and near the middle of the high television band, respectively, at say 78 mc. and 195 mc.

Figure 4:
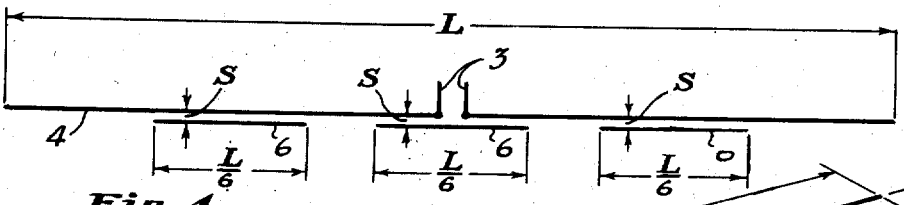
Fig. 4 is a diagrammatic plan view of a straight, driven dipole with three added, non-driven dipoles.

Referring now to the form of the invention shown in Fig. 4, the significant differences from the antenna of Fig. 3 are that three short, non-driven dipoles 6 are employed, each being *one-sixth* the length of the long, straight, driven dipole 4. The two outer dipoles 6 are longitudinally spaced apart a distance about twice their individual lengths, and the third dipole is disposed midway between the outer pair. At the full-wave resonant frequency of the driven dipole 4, the added non-driven dipoles have little effect. At the half-wave resonant frequency of the added non-driven dipoles 6 (about 3 times the lower frequency), the radiation pattern of the driven dipole 4 above would have four major lobes at the 45°, 135°, 225°, and 315° positions and two smaller lobes at the 0° and 180° positions. Addition of the three non-driven elements 6, however, practically eliminates all but the 0° lobe, which is considerably enlarged. In addition, the impedance at the high frequency may be brought close to 300 ohms.

In this case, the optimum low and high operating frequencies are in the ratio of about 1:3, as is the case with the antenna of Figs. 1 and 2, and these optimum frequencies may also be located substantially in the middle of the low and high television bands, respectively. Retention of the central non-driven element 6 without the presence of the two outer non-driven elements 6, produces very similar results though the 0° lobe in the radiation pattern is somewhat broadened and foreshortened at a given signal strength.

Figure 5:
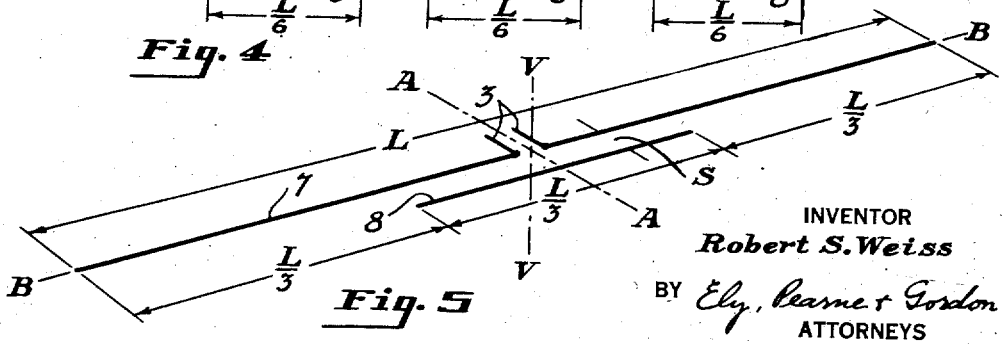
Fig. 5 is a diagrammatic perspective view of a straight, driven dipole with a single, added, non-driven dipole.
Figure 6:
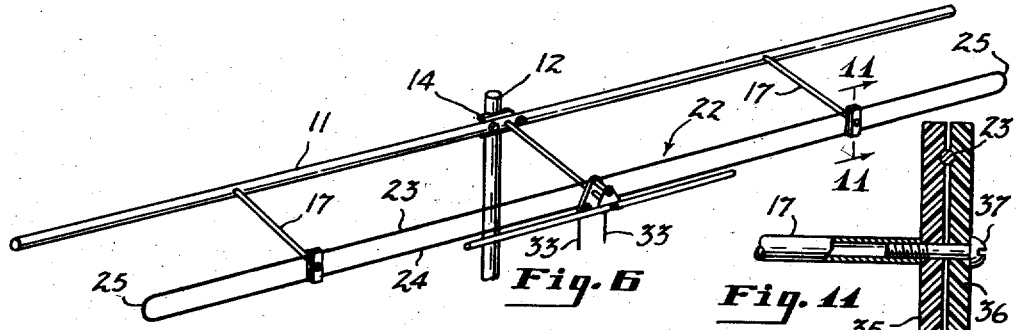
Fig. 6 is a perspective view of an antenna array embodying a folded, driven dipole, a single added non-driven dipole, and a reflector disposed behind the driven dipole.

Referring next to the antenna of Fig. 5, the invention is illustrated as applied in its simplest form to a straight driven dipole 7, designed for operation as a half-wave element on low band, instead of to a folded half-wave driven dipole 1, as in the antenna of Figs. 1 and 2. As in Figs. 1 and 2, a single, straight, non-driven dipole 8 is centrally disposed in closely spaced relationship in front of the driven dipole 7. Except for the fact that the driven straight dipole 7 has a lower impedance than a folded dipole of the same length, when they are operating essentially as half-wave elements, the mode of operation is essentially the same as for the antenna of Figs. 1 and 2, and the design considerations are also generally the same. As previously noted, the low impedance of this antenna renders it less suitable for television reception than the forms of the antennas previously described, though its physical simplicity is an advantage. For other radio frequency reception purposes, however, it has obvious desirable attributes.

As is the case with the antenna of Figs. 1 and 2, the optimum spacing S between the driven and non-driven dipoles in each of the antennas of Figs. 3 to 5 will depend in practice upon permissible variations in the other physical dimensions of the antennas. However, when using any of the moderate Q and high Q conductor materials commonly employed for dipole antennas, this spacing should fall within the range of about 1% to about 7% of a half-wave length at the low frequency in the low range to which the driven dipole is resonant, and is preferably from about 1% to about 5% thereof.

The foregoing description of diagrammatically illustrated forms of the invention treats the mode of operation of the antennas in an idealized manner, as will be recognized by those skilled in the art. When the invention is applied in practice, however, the described characteristics and modes of operation, or apparent modes of operation, are more or less closely approximated according to the particular service or commercial needs to be served. To further illustrate the invention, therefore, a number of illustrative, commercially practical antenna designs will now be described.

Referring to the form of the invention illustrated in Figs. 6, 7, and 9 to 11, a single bay antenna embodying the present invention is shown, the several figures being drawn approximately to scale. The construction shown utilizes a single, long, rigid, tubular element 11 both as the main supporting cross-arm for the antenna structure and as a parasitic reflector, generally in accordance with U. S. Patent No. 2,630,531 to Lewis H. Finneburgh, Jr. The reflector 11 may be secured directly to a vertical mast 12 by means of a conventional U-bolt 13 and saddle 14, the U-bolt embracing the mast 12 with its legs passing through the saddle 14 and reflector 11 so as to restrain the reflector against rotation about its own longitudinal axis. A pair of nuts 13 may be applied to the two legs of the U-bolt and tightened against the reflector 11 to clamp the assembly securely to the mast 12.

A plurality of outer minor cross-arms 17 and a central minor cross-arm 18 are suitably secured to the reflector 11 so as to extend forwardly and horizontally in parallel relationship as cantilever supporting arms. At their forward ends, the minor cross-arms 17 have suitable insulators secured thereto for supporting the outer portion of a driven dipole, hereinafter described, the driven dipole being spaced about ⅙ of its length from the reflector 11. The central minor cross-arm 18 passes through and beyond a generally triangular insulator 21 which supports the central portion of the driven dipole.

The driven dipole, generally designated 22, preferably of the folded dipole type, may comprise an elongated loop having upper and lower parallel spans 23 and 24. The upper span 23 of this dipole is electrically continuous from one outer extremity to the other, whereas the lower span 24 has a central gap bridge by the triangular supporting insulator 21. This central gap serves as a conventional feed gap in the manner hereinafter described. The outer extremities of the upper and lower spans 23 and 24 of the dipole 22 are integrally connected by short, rounded, end portions 25 of the dipole loop.

For convenience in assembling and mounting the dipole 22, it may be constructed of relatively small diameter rod e. g. about ⅛ inch, formed into identical right and left, half-loop portions having their inner free ends bent back upon themselves to form founting eyes 26. The mounting eyes 26 of the upper dipole span 23 are overlapped in alignment, and a screw 27 passes through these aligned eyes and through the upper portion of the triangular insulator 21 into a short supporting tube 28. The supporting tube 28 is disposed parallel to and is coextensive with the forward end portion 29 of the central minor cross-arm 18, which projects continuously through the triangular insulator 21. The interior of the short supporting tube 28 may be tapped to receive the screw 27 for tightening this portion of the assembly. The corresponding eyes 26 formed on the free ends of the lower portion 24 of the dipole 22 are separately secured to the triangular insulator 21 in horizontally spaced relationship by means of a pair of screws 31 and nuts 32, which also serve as terminals for the leads 33 of a two-conductor transmission line.

Figure 11:
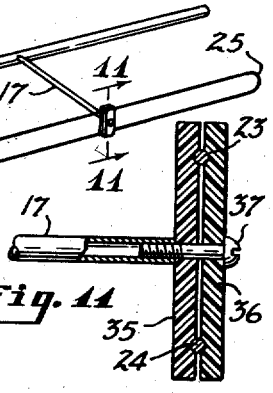
Fig. 11 is a fragmentary vertical section showing one form of insulating support for the driven dipole of both forms of the invention illustrated in Figs. 6 to 8, the plane of the section being indicated by the line 11—11 in Fig. 6.
Figure 7:
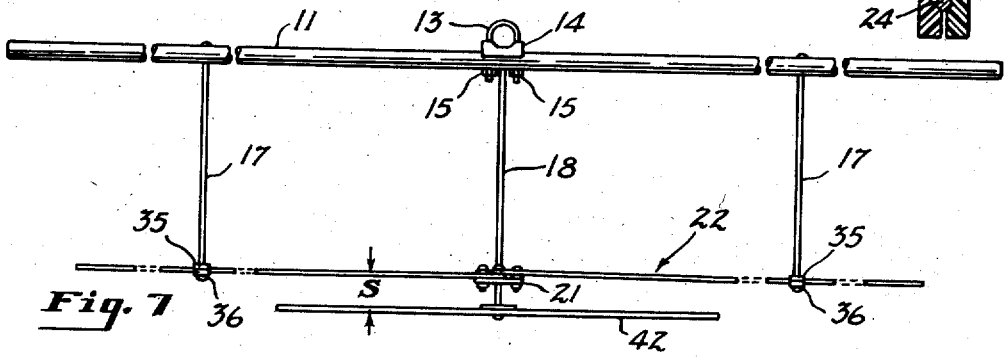
Fig. 7 is a foreshortened plan view, on an enlarged scale, of the antenna of Fig. 6.

For convenience in assembly, the supporting insulators referred to above as being mounted on the forward ends of the outer pair of minor cross-arms 17 may be formed in two parts 35 and 36 as shown in Fig. 11. Upper and lower aligned grooves may be formed in the adjacent faces of the two parts 35 and 36 to receive the upper and lower portions 23 and 24 of the dipole 22. Screws 37 may be passed through apertures in the centers of the insulator pieces 35 and 36 and be threaded into the forward ends of the outer minor arms 17 for clamping this assembly securely together. Alternatively, a single insulator block may be employed and be drilled to form a pair of apertures through which the portions 23 and 24 of the dipole 22 may be threaded before forming the eyes 26 thereon.

Figure 9:
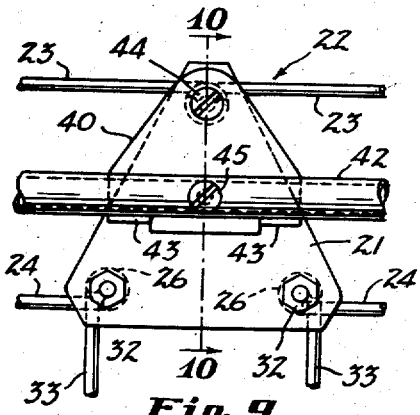
Fig. 9 is a fragmentary front elevation, on an enlarged scale, of both forms of the invention illustrated in Figs. 6 to 8.
Figure 10:
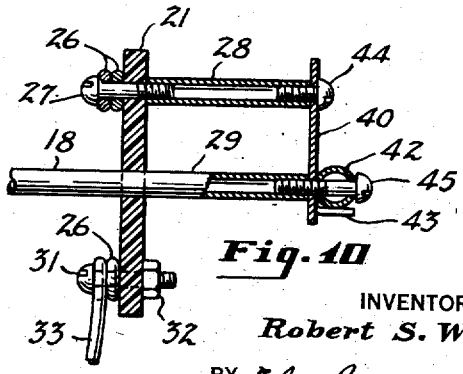
Fig. 10 is a vertical section through the structure shown in Fig. 9, the plane of the section being indicated by the line 10—10 in Fig. 9.

A generally triangular mounting plate 40, preferably formed of conductive sheet metal, is mounted on the forward ends of the short supporting tube 28 and the extension 29 of the central minor cross arm 18 for supporting a non-driven dipole element 42. In this embodiment of the invention, the non-driven dipole element is a single straight piece of hollow metal tubing of, say, ⅜ inch to ½ inch outside diameter. A pair of spaced supporting flanges 43 may be struck out from the lower edge of the metal supporting plate 40 to assist in maintaining the dipole 42 in horizontal, parallel alignment with the driven dipole 22. This portion of the assembly may be held rigidly together by means of a pair of screws 44 and 45, respectively threaded into the forward ends of the tubular supports 28 and 29, the screw 45 passing through the center of the tubular dipole 42, as best shown in Figs. 9 and 10.

Depending upon the particular frequencies at which maximum response is desired in the low and high band ranges, the dimensions and relative proportions of the various parts of the particular antenna illustrated in Figs. 6, 7, and 9 to 11 may obviously be varied over a considerable range. The optimum spacing of the non-driven element from the driven element (indicated by the dimension S in Fig. 2) for producing an impedance as close as possible to 300 ohms at some frequency in both the low and high bands will depend upon an even greater number of factors than is the case with the simpler antennas of Figs. 1 to 5. As will be recognized by one skilled in the art, in addition to the physical dimensions of the driven and non-driven dipoles themselves, these factors include the diameter and length of the reflector tube 11, the length of the metallic minor cross-arms 17 and 18 (which affect the optimum length of the reflector 11), the spacing between the folded dipole 22 and the reflector 11, and other design details which will have generally understood influences on the various electrical characteristics of the array as a whole.

As previously indicated, the spacing S affects the impedance of the antenna when operating in the high band range of frequencies, though it has very little effect when operating in the low band range. Therefore, this dimension may be adjusted experimentally to the optimum value for obtaining the best possible match of the impedance of the antenna to the impedance of the transmission line in the high band frequency range. For optimum results, this dimension S in the antenna of Figs. 6, 7, and 9 to 11 should be from about 1% to about 5% of a half-wave length at the low frequency to which the driven dipole 22 is resonant as a half-wave dipole, depending on the several variable factors referred to above.

As mentioned above, it is preferred that the center of the non-driven dipole be connected to ground. Also, as is customary in the art, the center point of the upper span of the driven folded dipole 22 (a point of zero voltage) is desirably grounded as a protection against lightning. It will be apparent from the drawings and the foregoing description that these two points on the driven and non-driven dipoles are electrically connected to each other through the metal plate 40, screw 44, supporting tube 28, and screw 27. It will also be apparent that both are electrically connected to the mast 12 through the central minor cross-arm 18, reflector 11, and U-bolt and saddle 13 and 14. Therefore, the desired grounding of the two dipoles requires merely that the mast 12 be grounded in any suitable manner.

Figure 8:
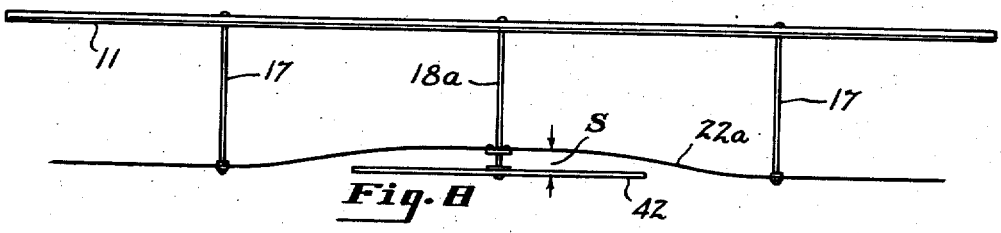
Fig. 8 is a plan view, on a reduced scale, of a modification of the antenna of Figs. 6 and 7.

Referring now to the modification of the invention illustrated in Fig. 8, the only significant difference from the antenna of Figs. 6, 7, and 9 to 11 is that the folded dipole 22a, viewed in plan, is bent inwardly, as shown in Fig. 8. This is done in order to position the non-driven dipole 42 substantially in the same vertical plane as the outer extremities of the driven dipole 22a, with the dimension S remaining essentially the same as before over most of the length of the non-driven dipole 42. This modification also requires that the central minor cross arm 18a be correspondingly shortened so that it has approximately the same overall length as the outer-minor cross arms 17. In all other respects, the construction of the antenna illustrated in Fig. 8 may be identical with that illustrated in Figs. 6, 7, and 9 to 11.

The advantage of the modification of the invention illustrated in Fig. 8 resides in the fact that the addition of the non-driven dipole 42 does not increase the overall dimensions of the antenna, and the entire assembly may be packaged in a carton no larger than would be required if the non-driven dipole 42 and the additional supporting structure therefor were entirely omitted. The changes made in securing this advantage undoubtedly have some effect upon the various electrical characteristics of the antenna, but this effect is small and can be compensated by proper adjustment of the other dimensions.

Referring next to the embodiment of the invention shown in Figs. 12 to 15, an arrangement of four stacked antenna arrays or bays is illustrated in which each bay is generally similar to the one illustrated in Fig. 8. The four bays are vertically spaced and interconnected in parallel through a feeding circuit to the leads 33 of a two-conductor transmission line. In this embodiment of the invention, however, the non-driven dipoles 42a have been given the configuration of elongated loops in order to increase their effectiveness over a broader frequency range. This will require some readjustment of the spacing between the driven and non-driven dipoles to maintain the desired impedance and of the length of the non-driven dipole 42a to maintain the same optimum frequency of operation in the high frequency range. In practice, with the particular design illustrated, the spacing averages about 2 to 3% of the half-wave length in the low frequency range to which the driven dipole 22a is resonant, being somewhat greater at the center than at the ends of the non-driven dipole 42a.

Except for additional minor changes in the structure for supporting this modified non-driven dipole, described below, each bay of the antenna of Figs. 12 to 15 is the same as the antenna of Fig. 8, and each bay is similarly mounted on the mast 12, as indicated by the use of the same reference characters on corresponding parts. For simplicity in interconnecting the upper and lower pairs of bays, however, alternate bays are inverted with respect to the other bays to which they are respectively directly connected.

As most clearly shown in Figs. 13 and 14, the elongated loop of the non-driven dipole 42a is made in right and left halves out of small diameter metal rod. Each half of this dipole has the ends of its two legs bent to form eyes 51 for receiving mounting screws. The two eyes 51 of one-half of this dipole are respectively overlapped in axial alignment with the corresponding eyes 51 of the other half of this dipole, as shown in Fig. 14. A flat metal strip 40a is employed to connect the forward end of the short supporting tube 28 to the forward end of the portion 29 of the minor cross arm 18a. A screw 52 passes through the upper overlapped pair of eyes 51, through the metal strip 40a, and into the short tube 28 in threaded engagement therewith. Another screw 53 passes through the lower overlapped pair of eyes 51 and through the metal strip 40a, and is threaded into the portion 29 of the minor cross arm 18a. Tightening of the two screws 52 and 53 rigidifies this relatively light weight portion of the assembly and holds the several parts in alignment as shown.

Since the modified non-driven dipole 42a is an electrically continuous, closed loop, and is shorted across the mid-points of the upper and lower spans of the loop, it actually functions as a simple dipole and only superficially resembles a folded dipole in appearance. Its advantage over a single straight rod or tube, such as the non-driven dipoles 42, is that the loop 42a simulates the electrical effect of a flat sheet of conductive material having the peripheral outline of the loop and maintains its effect over a broader frequency range.

As will be apparent, both the driven and non-driven dipoles in each bay of this antenna array are effectively grounded merely by grounding the mast 12, as is also the case with the previously described forms of the invention.

When stacking four such bays as illustrated in Fig. 12, the second and fourth bays are inverted so that the transmission line terminal screws 32 are on the upper span rather than on the lower span of these two bays. A pair of parallel, vertical, feeder conductors 55 respectively connect the terminal screws 32 of the uppermost bay to the opposite terminal screws 32 of the next lower bay; and the two lowermost bays are similarly connected together. Desirably, each of the vertical conductors 55 is made as two separate pieces 55a and 55b (Fig. 15) having overlapped eyes 56a and 56b where they are joined midway between the bays for receiving terminal screws 57 carried by a spacing insulator 58. This enables each interconnected pair of bays to be collapsed with a parallelogram type of folding action, generally in accordance with U. S. Patent No. 2,630,531 to Lewis H. Finneburgh, Jr.

The upper pair of bays is connected in parallel with the lower pair of bays by a pair of vertical conductors 60, which may be curved at their upper and lower ends, as shown in Fig. 12, and are respectively connected to the terminal screws 57 at the midpoints of the vertical feeders 55. The curving of the conductors 60 is for the purpose of giving them the desired overall length for matching the impedance of the entire array to the impedance of the transmission line in a well known manner. For simplicity of illustration, additional insulator supports for the curved vertical conductors 60 have been omitted.

Figure 16:
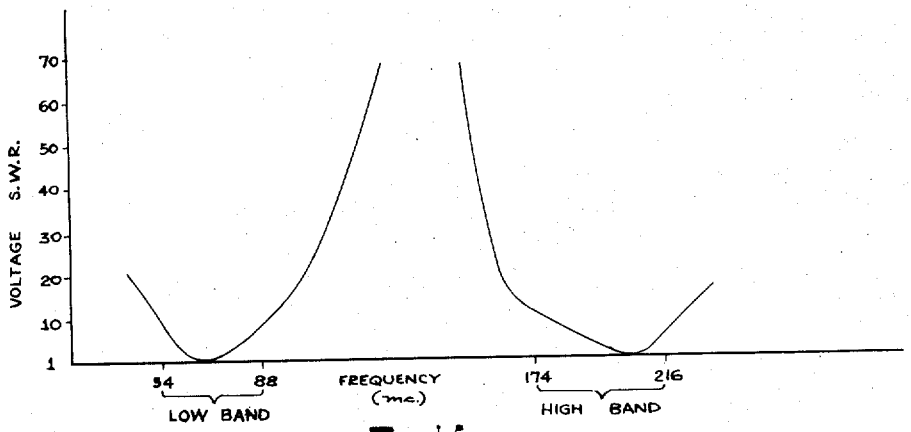
Fig. 16 is a typical graph showing the voltage standing wave ratio of one bay of the antenna of Figs. 12 to 15, plotted against frequency.

To illustrate the performance characteristics of the antenna of Figs. 12 to 15, and, at the same time, to demonstrate the manner in which the invention assists the performance in the desired frequency ranges and the rejection of signals outside those ranges, reference may be made to the typical voltage standing wave ratio curve shown in Fig. 16 for one bay of the four bay antenna of Figs. 12 to 15 (without the reflector) when connected directly to a 300 ohm transmission line. The curve of Fig. 16 was drawn from standing wave ratio data measured with a "Mega-Match" instrument manufactured by Kay Electric Co. Though this instrument tends to exaggerate somewhat the measured S. W. R. values greater than about 3, so that the high values indicated by the curve are somewhat too high, the characteristics of the array are shown by the curve with reasonable accuracy. As may readily be seen, the standing wave ratio rises rapidly between and beyond the low and high band frequency ranges. From this it is clear that the array is highly selective to frequencies in the desired ranges and has relatively little tendency to receive signals in adjacent frequency ranges, particularly the intermediate range of 88 to 174 mc. presently allocated to amateur, government, and commercial radio broadcasting.

For a more complete understanding of the factors affecting the performance of the various forms of the invention shown in Figs. 6 to 15, a discussion of the impedance matching problems will be helpful. When isolated from any reflector, director, or metallic supporting structure, a single folded dipole, at its half-wave resonant frequency, has an impedance of substantially 300 oms and, therefore, matches the impedance of a standard 300 ohm transmission line. It also has a figure 8 radiation pattern. Over a fair range of frequencies above and below the half-wave resonant frequency, the departure of the impedance of the folded dipole from 300 ohms is not so great as to seriously reduce the transmission of energy to the transmission line, and the radiation pattern changes very little. Thus, when dimensioned for about the center of the low band of frequencies, a folded dipole will serve with satisfactory efficiency over the entire low band.

Placing a much shorter, non-driven dipole centrally in front of a low band folded dipole, with close spacing in accordance with the present invention, has so little effect on either the impedance or radiation pattern of the antenna in the low band range that the effects are negligible insofar as television reception is concerned.

When a single, isolated, driven folded dipole, dimensioned for low band is operating in the high band range, however, its impedance rises to around 450 ohms, depending on the particular frequency of operation in the high band. Also, its radiation pattern is essentially a symmetrical four leaf or six leaf clover pattern with four main lobes disposed at about 45° to 55° to either side of the 0° and 180° positions. In this high band range, the added, non-driven dipole of about ⅓ the length of the folded dipole, spaced centrally in front of the folded dipole a distance between about 1% and 7% of a half-wave length to which the driven dipole is resonant has a very pronounced effect on both the impedance and radiation pattern of the antenna.

By adjusting the spacing of the driven and non-driven dipoles within the approximate limits specified, the impedance of the antenna at a frequency in the high band range can be adjusted to substantially 300 ohms and will maintain a satisfactory value over a range of frequencies comparable to the frequency range of the entire high band. At the same time, the radiation pattern is changed to provide a large, narrow forward lobe, with only relatively small minor lobes at other forward angles. Significantly, without a reflector, the array has a favorable front-to-back ratio on high band which varies with frequency. The particular frequency at which these results are most completely achieved in the high band range will vary, of course, with the lengths of the driven and non-driven dipoles.

When considering the use of reflectors and the stacking of a plurality of bays to obtain increased gain, many complicating factors are introduced which, as in any case of commercial antenna design, require the balancing of one effect against another to arrive at the final relationship considered to be optimum for the particular purpose to be served.

In the case of the antennas shown in Figs. 6 to 15, for example, the long reflector 11, relatively closely spaced behind the driven folded dipole, is a compromise between a low band reflector and a high band reflector (low band length with high band spacing), and the choice as to its length and its spacing from the driven element involves not only its effect on the gain of the antenna, but also its substantial effect on the impedance of the antenna, both on low band and high band.

In the case of the stacked array of four bays shown in Fig. 12, the effect of the reflectors 11 on the impedance of the individual bays also governs the design of the impedance matching circuit so as to produce the optimum match of the entire antenna array to the transmission line 33. Another factor to be considered in this connection is the optimum spacing of the individual bays from each other for both low band and high band operation, and the limitation on the vertical height of the entire array imposed by practical, commercial installation problems. Here again, the particular stacked array shown in Fig. 12 represents a satisfactory compromise and balancing of various factors. Obviously, by adding one or more directors to each individual antenna bay shown in Figs. 6 to 15, still further practical performance improvements may be achieved, though with some structural complication of the antennas.

Finally, to illustrate more clearly the effect of a change in the position of a non-driven dipole by moving it to different positions about the axis of the driven dipole, and the effect of using a plurality of transversely aligned non-driven dipoles, reference is made to Figs. 17 to 24.

Figure 17:
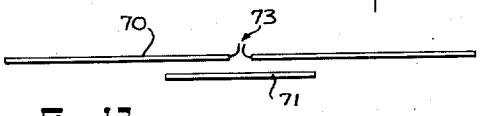
Fig. 17 is a plan view of a simple form of the invention, like that of Fig. 5, but made of hollow tubing.
Figure 18:
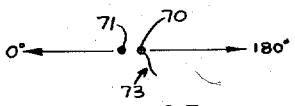
Fig. 18 is an end elevation of the antenna of Fig. 17.
Figure 19:
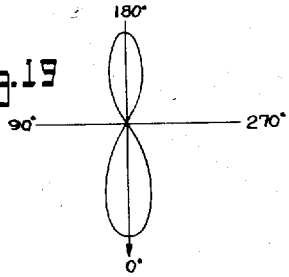
Fig. 19 is a polar diagram showing the horizontal radiation pattern of the antenna of Figs. 17 and 18 in the frequency range of 175 to 185 mc.

Figs. 17 and 18 are plan and end elevations of a driven dipole 70, that is 84 inches long, and has a non-driven dipole 71, that is 28 inches long, disposed centrally in front of it with respect to a signal to be received, both dipoles being made of ⅜ inch aluminum tubing and being spaced 2 inches apart. Transmission line leads 73 feed the driven dipole 70. Over the frequency range in the high band of about 175 to 185 mc., the radiation pattern in a horizontal plane was an eccentric figure 8 having its long lobe at 0° and its short lobe at 180°, with no side lobes, substantially as shown in Fig. 19. The 0° and 180° directions in Fig. 19 are indicated by arrows in Fig. 18. This demonstrates the front-to-back ratio of such an array, referred to above. Above and below this frequency range, small side lobes develop slowly with an increase or decrease in frequency, and the front-to-back ratio slowly increases. The optimum frequency range can be adjusted up or down by adjustment of dimensions, as explained above.

Figure 20:
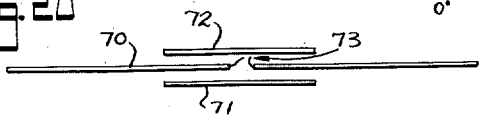
Fig. 20 is a plan view of the same antenna as Figs. 17 and 18, but with an additional non-driven dipole added thereto.
Figure 21:
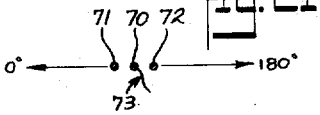
Fig. 21 is an end elevation of the antenna of Fig. 20.

Figs. 20 and 21 are plan and end elevations of the same antenna as Figs. 17 and 18, but with an additional non-driven dipole 72, identical with the non-driven dipole 71, added in transversely aligned relationship therewith and spaced 2 inches behind the driven dipole 70.

Figure 22:
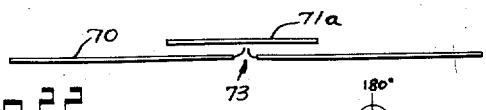
Fig. 22 is a front elevation of the antenna of Figs. 17 and 18 after being rotated 90° about the longitudinal axis of the driven dipole to position the non-driven dipole vertically above the driven dipole.
Figure 23:
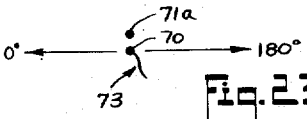
Fig. 23 is an end elevation of the antenna of Fig. 22.

Figs. 22 and 23 are front and end elevations of the same driven dipole 70 of Figs. 17, 18, 20, and 21, but with a single non-driven dipole 71a, identical with the non-driven dipoles 71 and 72 mentioned above, disposed directly above the driven dipole 70 with respect to a signal to be received.

Figure 24:
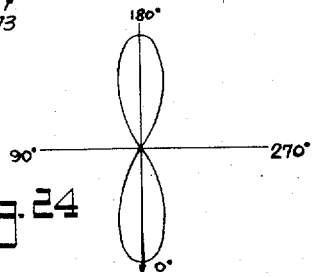
Fig. 24 is a polar diagram showing the horizontal radiation pattern of the antenna of Figs. 20 and 21 and also of the antenna of Figs. 22 and 23.

Fig. 24 shows the radiation pattern of both of the arrays of Figs. 20 and 21 and Figs. 22 and 23 over the range of 175 to 185 mc. The 0° and 180° directions in Fig. 24 are indicated by arrows in both Fig. 21 and Fig. 23. Over the frequency range, both of these arrays have practically identical radiation patterns substantially as shown with no side lobes and no front-to-back ratio. Above and below this range, small side lobes develop slowly, but there continues to be no front-to-back ratio.

Essentially the only differences between the performance of the array of Figs. 20 and 21 and the array of Figs. 22 and 23 is that the additional non-driven dipole in the former tends to give the array a somewhat lower impedance in the high frequency range, and side lobes in the radiation pattern develop in size at a somewhat slower rate above and below the optimum range as regards radiation pattern. Thus, by using two or more non-driven dipoles distributed in a generally cylindrical array (approaching a cylinder as more are added), and by adjusting their spacing from the non-driven dipole, a greater measure of control is obtained over the impedance of the array while retaining essentially the same radiation pattern. *However, as explained above, this is accomplished at the expense of the desired front-to-back ratio and increases the complexity, weight, and cost of the antenna compared to one employing only a single, forward, non-driven dipole in accordance with the invention.*

Figs. 17 to 24 also demonstrate that the action of the non-driven dipoles is entirely different from the action of either a director or a reflector. Obviously, if the non-driven element 71 of Fig. 19 functioned as a director for radiation coming from the 0° direction at a given frequency, it would be the wrong length to operate as a reflector for radiation from the 180° direction, and use of identical non-driven elements on both sides of the driven element, as in the array of Figs. 20 and 21, would tend to produce nulls in the radiation pattern at both the 0° and 180° positions, whereas this does not occur as cleary shown by the radiation pattern of Fig. 24. Also, a director is effective only when disposed between the driven element and the source of a signal to be received, whereas the non-driven element of Figs.

22 and 23, disposed 90° out of such alignment, has virtually the same effect on the radiation pattern as the pair of non-driven elements 17 and 72 in Figs. 20 and 21, which are aligned with the driven element and the source of the signal to be received.

As will be appreciated from the above descriptions of various forms of the invention, a distinguishing characteristic of the invention common to all forms thereof is the close spacing of driven and non-driven dipoles. From the examples described for illustrative purposes, it will also be appreciated that the driven and non-driven dipoles may have various lengths relative to each other. Depending upon the particular purpose to be served, still other relative lengths of the driven and non-driven dipoles may be employed with the characteristic close spacing to achieve a variety of desirable impedance characteristics and radiation patterns. Since the optimum values for the spacing of the driven and non-driven dipoles and their relative lengths in any particular, practical antenna depend upon many variables, there can be no simple, empirical formula, if any at all, by which these relationships can be precisely defined. Thus, it is to be understood that the spacings and relative lengths specified above and in the appended claims are necessarily approximate values or ranges of values, and they should be so construed in interpreting the scope of the invention disclosed and claimed herein.

From the foregoing description of the invention and various illustrative embodiments thereof, it will be appreciated that I have provided basic antenna arrays having many desirable electrical characteristics for television reception in the fringe areas, and practical embodiments of such arrays that also have the mechanical compactness and simplicity desired for commercial production. Furthermore, the particular embodiments of the invention disclosed in Figs. 6 to 15 are easily and quickly installed and, when installed, have a high degree of symmetry and an overall appearance which are attractive to the domestic trade to which such antennas are sold.

This application is a continuation-in-part of my copending application Serial No. 502,607, filed April 20, 1955, for Radio Frequency Antennas, now abandoned.

Having described my invention, I claim:

[1. A radio frequency antenna comprising a long driven dipole and a short, non-driven dipole arranged in closely spaced parallel relationship, the driven dipole having a length selected to render it resonant as a dipole at least a half-wave long at a first selected frequency and having an L/D ratio of at least 40, the non-driven dipole having a length selected to render it resonant as a half-wave dipole at a second higher frequency which is substantially a harmonic resonant frequency of the driven dipole at least three times said first frequency, and the spacing of the driven and non-driven dipoles being from about 1% to about 7% of a half-wave length at said first frequency.]

[2. A radio frequency antenna comprising a long, driven dipole and at least one short, non-driven dipole arranged in closely spaced parallel relationship, the driven dipole having a length selected to render it resonant as a dipole at least a half-wave long at a first selected frequency and having an L/D ratio of at least 40, the non-driven dipoles having lengths selected to render them resonant as half-wave elements at approximately a common higher frequency which is substantially a harmonic resonant frequency of the driven dipole at least three times said first frequency, and the spacing of the driven and non-driven dipoles being from about 1% to about 7% of a half-wave length at said first frequency.]

[3. A radio frequency antenna comprising a long, driven dipole and a short, non-driven dipole arranged in closely spaced parallel relationship, the driven dipole having a length selected to render it resonant as a dipole at least a half-wave long at a first selected frequency and having an L/D ratio of at least 40, the non-driven dipole having a length selected to render it resonant as a half-wave dipole at a second higher frequency which is substantially three times said first frequency, and the spacing of the driven and non-driven dipoles being from about 1% to about 7% of a half-wave length at said first frequency.]

[4. A radio frequency antenna comprising a long, driven dipole and a short, non-driven dipole arranged in closely spaced parallel relationship, the driven dipole having a length selected to render it resonant as a half-wave dipole at a first selected frequency and having an L/D ratio of at least 40, the non-driven dipole having a length selected to render it resonant as a half-wave element at approximately three times said first frequency, and the spacing between the driven and non-driven dipoles being from about 1% to about 7% of a half-wave length at said first frequency.]

[5. A radio frequency antenna comprising a long, driven dipole and a short, non-driven dipole arranged in closely spaced parallel relationship, the driven dipole having a length selected to render it resonant as a half-wave dipole at a first selected frequency and having an L/D ratio of at least 40, the non-driven dipole having a length selected to render it resonant as a half-wave element at approximately three times said first frequency, and the spacing between the driven and non-driven dipoles being from about 1% to about 7% of the length of the driven dipole.]

[6. A radio frequency antenna comprising a long, driven dipole and at least one short, non-driven dipole arranged in closely spaced parallel relationship, the driven dipole having a length selected to render it resonant as a half-wave dipole at a first selected frequency and having an L/D ratio of at least 40, the non-driven dipoles being transversely aligned substantially centrally with respect to the driven dipole and having lengths selected to render them resonant as half-wave dipoles at approximately three times said first frequency, and the spacing of the driven and non-driven dipoles being from about 1% to about 7% of the length of the driven dipole.]

[7. A radio frequency antenna comprising a long, driven dipole and a short, non-driven dipole arranged in closely spaced parallel relationship, the driven dipole having a length selected to render it resonant as a dipole at least a half-wave long at a first selected frequency and having an L/D ratio of at least 40, the non-driven dipole having a length selected to render it resonant as a half-wave dipole at a second higher frequency which is substantially a harmonic resonant frequency of the driven dipole at least three times said first frequency, and the spacing of the driven and non-driven dipoles being from about 1% to about 7% of a half-wave length at said first frequency, and means for mounting said antenna with the non-driven dipole disposed substantially between the driven dipole and the source of a signal to be received.]

[8. A radio frequency antenna comprising a long, driven dipole and a plurality of short, non-driven dipoles arranged in closely spaced parallel relationship, the driven dipole having a length selected to render it resonant as a half-wave element at a first selected frequency and having an L/D ratio of at least 80, the non-driven dipoles being transversely aligned substantially centrally with respect to the driven dipole and having lengths selected to render them resonant as half-wave elements at approximately three times said first frequency, said non-driven dipoles being spaced apart about the longitudinal axis of the driven dipole and spaced therefrom at distances from about 1% to about 5% of the length of the driven dipole.]

[9. A radio frequency antenna comprising a long, driven dipole and a plurality of short, non-driven dipoles arranged in closely spaced parallel relationship, the driven dipole having a length selected to render it resonant as a half-wave element at a first selected frequency and having an L/D ratio of at least 80, the non-driven dipoles being transversely aligned substantially centrally with respect to the driven dipole and having lengths selected to render them resonant as half-wave elements at approximately three times said first frequency, said non-driven dipoles being spaced apart about the longitudinal axis of the driven dipole and spaced therefrom at distances from about 1% to about 5% of the length of the driven dipole, and means for mounting said antenna with one of said non-driven dipoles disposed substantially between the driven dipole and the source of a signal to be received.]

[10. A radio frequency antenna comprising a long, driven, folded dipole and a short non-driven dipole arranged in closely spaced parallel relationship with the non-driven dipole transversely aligned substantially centrally with respect to the folded dipole, the folded dipole having a length selected to render it resonant as a half-wave element at a selected frequency and being formed of conductor material having an L/D ratio of at least 40, the non-driven dipole having a length selected to render it resonant as a half-wave element at about three times said selected frequency, and the spacing of the driven and non-driven dipoles being from about 1% to about 7% of a half-wave length at said selected frequency.]

[11. A radio frequency antenna comprising a long, driven, folded dipole and a short non-driven dipole arranged in closely spaced parallel relationship with the non-driven dipole transversely aligned substantially centrally with respect to the folded dipole, the folded dipole having a length selected to render it resonant as a half-wave element at a selected frequency and being formed of conductor material having an L/D ratio of at least 80, the non-driven dipole having a length selected to render it resonant as a half-wave element at about three times said selected frequency, and the spacing of the driven and non-driven dipoles being from about 1% to about 5% of a half-wave length at said selected frequency.]

[12. A radio frequency antenna comprising a long, driven, folded dipole and a short non-driven dipole arranged in closely spaced parallel relationship with the non-driven dipole transversely aligned substantially centrally with respect to the folded dipole, the folded dipole having a length selected to render it resonant as a half-wave element at a selected frequency and being formed of conductor material having an L/D ratio of at least 40, the non-driven dipole having a length selected to render it resonant as a half-wave element at about three times said selected frequency, and the spacing of the driven and non-driven dipoles being from about 1% to about 7% of a half-wave length at said selected frequency, and means for mounting the antenna with the non-driven dipole disposed substantially between the folded dipole and the source of a signal to be received.]

[13. A radio frequency antenna comprising a long, driven, folded dipole and at least one short, non-driven dipole arranged in closely spaced parallel relationship, means for mounting said dipoles with the long spans of the folded dipole disposed substantially in a common vertical plane normal to the direction of a signal to be received and with one non-driven dipole disposed substantially centrally between the folded dipole and the source of a signal to be received, the folded dipole having a length selected to render it resonant as a half-wave element at a selected frequency and being formed of conductor material having an L/D ratio of at least 80, each non-driven dipole having a length selected to render it resonant as a half-wave element at substantially three times said selected frequency, and the spacing of the driven and non-driven dipoles being from about 1% to about 5% of the length of the folded dipole.]

[14. A television antenna comprising a driven, half-wave, folded dipole resonant at a first frequency in the range of 54 to 88 megacycles and a relatively short, non-driven dipole arranged in closely spaced parallel relationship therewith, means for mounting said dipoles with the long spans of the folded dipole disposed vertically one above the other and with the non-driven dipole disposed substantially centrally between the folded dipole and the source of a signal to be received, the folded dipole being formed of conductor material having an L/D ratio of at least 80, the non-driven dipole having a length selected to render it resonant as a half-wave element at approximately three times said first frequency, and the spacing of the folded and non-driven dipoles being from about 1% to about 7% of a half-wave length at said first frequency.]

[15. A television antenna comprising a driven, half-wave, folded dipole resonant at a first frequency in the range of 54 to 88 megacycles and a relatively short, non-driven dipole arranged in closely spaced parallel relationship therewith, means for mounting said dipoles with the long spans of the folded dipole disposed vertically one above the other and with the non-driven dipole disposed substantially centrally between the folded dipole and the source of a signal to be received, the folded dipole being formed of conductor material having an L/D ratio of at least 80, the non-driven dipole being in the form of an elongated loop the major axis of which has a length selected to render the loop resonant as a half-wave simple dipole at approximately three times said first frequency, and the spacing of the folded and non-driven dipoles being from about 1% to about 5% of a half-wave length at said first frequency.]

16. A radio frequency antenna comprising a rigid rectilinear reflector, a dipole mounted on said reflector and disposed substantially centrally in front of the reflector and generally parallel thereto, said dipole having about the central one third portion of its length offset toward said reflector, a conductor about one third the length of said dipole mounted substantially centrally in front of said central portion of said dipole, substantially in alignment with the end portions thereof and spaced from said central portion thereof.

17. A television antenna comprising a rigid rectilinear reflector, means for mounting said reflector broadside to a signal to be received, a folded dipole having a half-wave resonant frequency in the range of 54 to 88 megacycles, said folded dipole being mounted on said reflector and disposed substantially centrally in front of the reflector and generally parallel thereto and with the spans of the folded dipole in a common vertical plane, said folded dipole having about the central one-third portion of the length thereof offset toward said reflector and disposed substantially closer to said reflector than are the end portions of the folded dipole, and a conductor about ⅓ the length of said folded dipole mounted horizontally and substantially centrally in front of said folded dipole and substantially in the same vertical plane as the end portions thereof, said conductor being spaced a distance of about 1% to about 7% of the length of said folded dipole from the central one-third portion thereof.

18. A television antenna comprising a rigid rectilinear reflector, means for mounting said reflector broadside to a signal to be received, a folded dipole having a half-wave resonant frequency in the range of 54 to 88 megacycles, said folded dipole being mounted on said reflector and disposed substantially centrally in front of the reflector and generally parallel thereto and with the two long spans of the folded dipole in a common vertical plane, said folded dipole having the central portion of the length thereof offset toward said reflector and disposed substantially closer to said reflector than are the end portions of the folded dipole, a conductor approximately ⅓ the length of said folded dipole mounted horizontally and substantially centrally in front of said folded dipole, said conductor being spaced from about 1% to about 7% of the length of the folded dipole from the offset central portion thereof, there being an electrical connection between the center of said reflector, the center of one long span of said folded dipole, and the center of said conductor for grounding the same, and terminals for connecting a two-conductor transmission line to the other long span of said folded dipole.

19. A television antenna comprising a rigid rectilinear reflector, means for mounting said reflector broadside to a signal to be received, an elongated folded dipole having a half-wave resonant frequency in the range of 54 to 88 megacycles, said folded dipole being mounted on said reflector and disposed substantially centrally in front of the reflector with its major axis generally parallel thereto and with the two long spans of the folded dipole in a common vertical plane, said folded dipole having about the central one-third portion of the length thereof offset toward said reflector and disposed substantially closer to said reflector than are the end portions of the folded dipole, a conductive element in the form of an elongated loop having the length of its major axis approximately ⅓ the length of the major axis of said folded dipole, said element being mounted with its major axis extending horizontally and being substantially centrally disposed in front of said folded dipole and substantially in the same vertical plane as the end portions thereof, said element being spaced from about 1% to about 7% of the length of said folded dipole from said central portion thereof, and terminals for connecting a two-conductor transmission line to one long span of said folded dipole.

20. A television antenna comprising a rigid rectilinear reflector, means for mounting said reflector broadside to a signal to be received, an elongated folded dipole having a half-wave resonant frequency in the range of 54 to 88 megacycles, said folded dipole being mounted on said reflector and disposed substantially centrally in front of the reflector with its major axis generally parallel thereto and with the two long spans of the folded dipole in a common vertical plane, said folded dipole having the central portion of the length thereof offset toward said reflector and disposed substantially closer to said reflector than are the end portions of the folded dipole, a conductive element in the form of an elongated loop having the length of its major axis selected to render said loop resonant as a half-wave element in the range of 174 to 216 megacycles, said loop being mounted substantially in a vertical plane with its major axis extending horizontally and being substantially centrally disposed in front of said folded dipole and spaced from about 1% to about 7% of the length of the folded dipole from the offset central portion thereof.

*21. A radio frequency antenna comprising a long driven dipole and a single, short, non-driven dipole arranged in closely spaced parallel relationship, the driven dipole having a length selected to render it resonant as a dipole at least a half-wave long at a first selected frequency and having an L/D ratio of at least 40, the non-driven dipole having a length selected to render it resonant as a half-wave dipole at a second higher frequency which is substantially a harmonic resonant frequency of the driven dipole at least three times said first frequency, and the spacing of the driven and non-driven dipoles being from about 1% to about 7% of a half-wave length at said first frequency.*

*22. A radio frequency antenna comprising a long, driven dipole and at least one short, non-driven dipole, each such non-driven dipole being disposed in front of the driven dipole with reference to the same single direction of transmission or reception and arranged in closely spaced parallel relationship with the driven dipole, the driven dipole having a length selected to render it resonant as a dipole at least a half-wave long at a first selected frequency and having an L/D ratio of at least 40, the non-driven dipoles having lengths selected to render them resonant as half-wave elements at approximately a common higher frequency which is substantially a harmonic resonant frequency of the driven dipole at least three times said first frequency, and the spacing of the driven and non-driven dipoles being from about 1% to about 7% of a half-wave length at said first frequency.*

*23. A radio frequency antenna comprising a long, driven dipole and a single, short, non-driven dipole arranged in closely spaced parallel relationship, the driven dipole having a length selected to render it resonant as a dipole at least a half-wave long at a first selected frequency and having an L/D ratio of at least 40, the non-driven dipole having a length selected to render it resonant as a half-wave dipole at a second higher frequency which is substantially three times said first frequency, and the spacing of the driven and non-driven dipoles being from about 1% to about 7% of a half-wave length at said first frequency.*

*24. A radio frequency antenna comprising a long, driven dipole and a single, short, non-driven dipole arranged in closely spaced parallel relationship, the driven dipole having a length selected to render it resonant as a half-wave dipole at a first selected frequency and having an L/D ratio of at least 40, the non-driven dipole having a length selected to render it resonant as a half-wave element at approximately three times said first frequency, and the spacing between the driven and non-driven dipoles being from about 1% to about 7% of a half-wave length at said first frequency.*

*25. A radio frequency antenna comprising a long, driven dipole and a single, short, non-driven dipole arranged in closely spaced parallel relationship, the driven dipole having a length selected to render it resonant as a half-wave dipole at a first selected frequency and having an L/D ratio of at least 40, the non-driven dipole having a length selected to render it resonant as a half-wave element at approximately three times said first frequency, and the spacing between the driven and non-driven dipoles being from about 1% to about 7% of the length of the driven dipole.*

*26. A radio frequency antenna comprising a long driven dipole and at least one short, non-driven dipole, each such non-driven dipole being disposed in front of the driven dipole with reference to the same single direction of transmission or reception and arranged in closely spaced parallel relationship with the driven dipole, the driven dipole having a length selected to render it resonant as a half-wave dipole at a first selected frequency and having an L/D ratio of at least 40, each such non-driven dipole having a length selected to render it resonant as a half-wave dipole at a higher frequency which is substantially a harmonic of said first frequency, and the spacing of the driven and non-driven dipoles being from about 1% to about 7% of the length of the driven dipole.*

*27. A radio frequency antenna comprising a long driven dipole and a single, short, non-driven dipole arranged in closely spaced parallel relationship, the driven dipole having a length selected to render it resonant as a dipole at least a half-wave long at a first selected frequency and having an L/D ratio of at least 40, the non-driven dipole having a length selected to render it resonant as a half-wave dipole at a second higher frequency which is substantially a harmonic resonant frequency of the driven dipole at least three times said first frequency, and the spacing of the driven and non-driven dipoles being from about 1% to about 7% of a half-wave length at said first frequency, and means for mounting said antenna with the non-driven dipole disposed substantially between the driven dipole and the source of a signal to be received.*

*28. A radio frequency antenna comprising a long, driven dipole and a plurality of short, non-driven, collinear dipoles all disposed in front of the driven dipole with reference to a single direction of transmission or reception and arranged in closely spaced parallel relationship with the driven dipole, the driven dipole having a length selected to render it resonant as a half-wave element at a first selected frequency and having an L/D ratio of at least 80, the non-driven dipoles being longitudinally*

*spaced apart and having lengths selected to render them resonant as half-wave elements at a second higher frequency which is substantially a harmonic of said first frequency, said non-driven dipoles being spaced from the driven dipole from about 1% to about 5% of the length of the driven dipole.*

*29. A radio frequency antenna comprising a long, driven dipole and a plurality of short, non-driven dipoles all disposed in collinear alignment in front of the driven dipole with reference to a single direction of transmission or reception and arranged in closely spaced parallel relationship with the driven dipole, the driven dipole having a length selected to render it resonant as a half-wave element at a first selected frequency and having an L/D ratio of at least 80, the non-driven dipoles being longitudinally spaced apart about a half-wave at a second higher frequency which is a harmonic of said first frequency and all having lengths selected to render them resonant as half-wave elements at approximately said higher harmonic frequency, said non-driven dipoles being spaced from the driven dipole from about 1% to about 5% of the length of the driven dipole.*

*30. A radio frequency antenna comprising a single, long, driven, folded dipole and a single, short, non-driven dipole arranged in closely spaced parallel relationship with the folded dipole and transversely aligned substantially centrally with respect to the folded dipole, the folded dipole having a length selected to render it resonant as a half-wave element at a selected frequency and being formed of conductor material having an L/D ratio of at least 40, the non-driven dipole having a length selected to render it resonant as a half-wave element at about three times said selected frequency, and the spacing of the folded and non-driven dipoles being from about 1% to about 7% of a half-wave length at said selected frequency.*

*31. A radio frequency antenna comprising a single, long, driven, folded dipole and a single, short, non-driven dipole arranged in closely spaced parallel relationship with the folded dipole and transversely aligned substantially centrally with respect to the folded dipole, the folded dipole having a length selected to render it resonant as a half-wave element at a selected frequency and being formed of conductor material having an L/D ratio of at least 80, the non-driven dipole having a length selected to render it resonant as a half-wave element at about three times said selected frequency, and the spacing of the folded and non-driven dipoles being from about 1% to about 5% of a half-wave length at said selected frequency.*

*32. A radio frequency antenna comprising a long, driven, folded dipole and a single, short, non-driven dipole arranged in closely spaced parallel relationship with the folded dipole, the folded dipole having a length selected to render it resonant as a half-wave element at a selected frequency and being formed of conductor material having an L/D ratio of at least 40, the non-driven dipole having a length selected to render it resonant as a half-wave element at about three times said selected frequency, and the spacing of the folded and non-driven dipoles being from about 1% to about 7% of a half-wave length at said selected frequency, and means for mounting the antenna with the non-driven dipole disposed substantially centrally between the folded dipole and the source of a signal to be received.*

*33. A radio frequency antenna comprising a long, driven, folded dipole and at least one short, non-driven dipole, each such non-driven dipole being disposed in front of the driven dipole with reference to the same single direction of transmission or reception and arranged in closely spaced parallel relationship with the driven dipole, means for mounting said dipoles with the long spans of the driven folded dipole disposed substantially in a common vertical plane normal to said direction and with one non-driven dipole disposed substantially centrally with respect to the ends of the folded dipole, the folded dipole having a length selected to render it resonant as a half-wave element at a selected frequency and being formed of conductor material having an L/D ratio of at least 80, each non-driven dipole having a length selected to render it resonant as a half-wave element at substantially three times said selected frequency, the non-driven dipoles being longitudinally spaced apart in collinear alignment, and the spacing of the driven and non-driven dipoles being from about 1% to about 5% of the length of the driven dipole.*

*34. A television antenna comprising a driven, half-wave, folded dipole resonant at a first frequency in the range of 54 to 88 megacycles and a single, relatively short, non-driven dipole arranged in closely spaced parallel relationship therewith, means for mounting said dipoles with the long spans of the folded dipole disposed vertically one above the other and with the non-driven dipole disposed substantially centrally between the folded dipole and the source of a signal to be received, the folded dipole being formed of conductor material having an L/D ratio of at least 80, the nono-driven dipole having a length selected to render it resonant as a half-wave element at approximately three times said first frequency, and the spacing of the folded and non-driven dipoles being from about 1% to about 7% of a half-wave length at said first frequency.*

*35. A television antenna comprising a driven, half-wave, folded dipole resonant at a first frequency in the range of 54 to 88 megacycles and a single, relatively short, non-driven dipole arranged in closely spaced parallel relationship therewith, means for mounting said dipoles with the long spans of the folded dipole disposed vertically one above the other and with the non-driven dipole disposed substantially centrally between the folded dipole and the source of a signal to be received, the folded dipole being formed of conductor material having an L/D ratio of at least 80, the non-driven dipole being in the form of an elongated loop, the major axis of which has a length selected to render the loop resonant as a half-wave simple dipole at approximately three times said first frequency, and the spacing of the folded and non-driven dipoles being from about 1% to about 5% of a half-wave length at said first frequency.*

*36. A radio frequency antenna comprising a long driven dipole and a single, short, non-driven dipole arranged in closely spaced parallel relationship, the driven dipole having a length selected to render it resonant as a dipole at least a half-wave long at a first selected frequency and having an L/D ratio of at least 40, the non-driven dipole having a length selected to render it resonant as a half-wave dipole at a second higher frequency which is substantially a harmonic resonant frequency of the driven dipole at least three times said first frequency, and the driven and non-driven dipoles being in such close proximity, within the range from about 1% to about 7% of the half-wave length at said first frequency, that their coextensive portions comprise a resonant transmission line section, whereby radiation from one is substantially counteracted by radiation from the other at said second higher frequency.*

*37. A radio frequency antenna comprising a long, driven dipole and a single, short, non-driven dipole arranged in closely spaced parallel relationship, the driven dipole having a length selected to render it resonant as a half-wave dipole at a first selected frequency and having an L/D ratio of at least 40, the non-driven dipole having a length selected to render it resonant as a half-wave element at approximately three times said first frequency, and the driven and non-driven dipoles being in such close proximity, within the range from about 1% to about 7% of a half-wave length at said first frequency, that their coextensive portions comprise a resonant transmission line section, whereby radiation from one is sub-*

*stantially counteracted by radiation from the other at said second higher frequency.*

*38. A radio frequency antenna comprising a long driven dipole and at least one short, non-driven dipole, each such non-driven dipole being disposed in front of the driven dipole with reference to the same single direction of transmission or reception and arranged in closely spaced parallel relationship with the driven dipole, the driven dipole having a length selected to render it resonant as a half-wave dipole at a first selected frequency and having an L/D ratio of at least 40, each such non-driven dipole having a length selected to render it resonant as a half-wave dipole at a higher frequency which is substantially a harmonic of said first frequency, each of said non-driven dipoles and the coextensive portion of the driven dipole being in such close proximity, within the range from about 1% to about 7% of a half-wave length at said first frequency, that they comprise a resonant transmission line section, whereby radiation from one is substantially counteracted by radiation from the coextensive portion of the other at the frequency of resonance of the transmission line section.*

*39. A radio frequency antenna comprising a long, driven dipole and a plurality of short, non-driven dipoles all disposed in collinear alignment in front of the driven dipole with reference to a single direction of transmission or reception and arranged in closely spaced parallel relationship with the driven dipole, the driven dipole having a length selected to render it resonant as a half-wave element at a first selected frequency and having an L/D ratio of at least 80, the non-driven dipoles being longitudinally spaced apart about a half-wave at a second higher frequency which is a harmonic of said first frequency and all having lengths selected to render them resonant as half-wave elements at approximately said higher harmonic frequency, each of said non-driven dipoles and the coextensive portion of the driven dipole being in such close proximity, within the range from about 1% to about 5% of a half-wave length at said first frequency, that they comprise a resonant transmission line section, whereby radiation from one is substantially counteracted by radiation from the coextensive portion of the other at said harmonic frequency.*

*40. A television antenna comprising a driven, half-wave, folded dipole resonant at a first frequency in the range of 54 to 88 megacycles and a single, relatively short, non-driven dipole arranged in closely spaced parallel relationship therewith, means for mounting said dipoles with the long spans of the folded dipole disposed vertically one above the other and with the non-driven dipole disposed substantially centrally between the folded dipole and the source of a signal to be received, the folded dipole being formed of conductor material having an L/D ratio of at least 80, the non-driven dipole having a length selected to render it resonant as a half-wave element at approximately three times said first frequency, and the folded and non-driven dipoles being in such close proximity, within the range from about 1% to about 5% of a half-wave length at said first frequency, that their coextensive portions comprise a resonant transmission line section, whereby radiation from one is substantially counteracted by radiation from the other at about three times said first frequency.*

References Cited in the file of this patent or the original patent

| | | |
|---|---|---|
| 2,380,519 | Green | July 31, 1945 |
| 2,474,480 | Kearse | June 28, 1949 |
| 2,485,138 | Carter | Oct. 18, 1949 |
| 2,534,592 | Goumas | Dec. 19, 1950 |
| 2,572,166 | Lorusso | Oct. 23, 1951 |
| 2,580,798 | Kolster | Jan. 1, 1952 |
| 2,700,105 | Winegard | Jan. 18, 1955 |